Dec. 2, 1958  S. B. MILLER  2,862,375
SEVERABLE COUPLING
Filed Feb. 7, 1957  2 Sheets-Sheet 1

INVENTOR.
Sherman B. Miller
BY
Brumbaugh, Free, Graves & Donohue
ATTORNEYS

Dec. 2, 1958  S. B. MILLER  2,862,375
SEVERABLE COUPLING
Filed Feb. 7, 1957  2 Sheets-Sheet 2

INVENTOR.
Sherman B. Miller
BY
Brumbaugh, Free, Graves & Donohue
ATTORNEYS

United States Patent Office 2,862,375
Patented Dec. 2, 1958

2,862,375

SEVERABLE COUPLING

Sherman B. Miller, East Norwich, N. Y., assignor to Fairchild Engine and Airplane Corporation, Bay Shore, N. Y., a corporation of Maryland Application February 7, 1957, Serial No. 638,818

6 Claims. (Cl. 64—28)

This invention relates to a novel coupling between driving and driven elements of a drive transmission, and to companion apparatus for severing the coupling in the event of an emergency condition.

In many power plants, various accessories, such as pumps, generators and the like, are driven from a main engine or drive via drive transmissions. In the event of failure of the driven accessory, it becomes desirable to discontinue the drive transmission from the main drive; otherwise it will be necessary to shut down the main drive during the repair or servicing of the accessory. In many cases, however, the continued operation of the main drive is required so that it is impossible or unfeasible to shut down the operation of the entire power plant, as, for example, in the power plant of an airplane where the continued operation of the main engines is necessary to sustain the airplane in flight. In some cases, clutches can be utilized to disconnect the accessory from the main drive, but heavy and elaborate clutch mechanisms would not be justified for use in aircraft, particularly inasmuch as the clutch would rarely, if ever, be used.

The object of the present invention is to provide a severable coupling for the drive transmission between the drive engine and a driven accessory which normally effectively transmits the drive without slippage or failure and, in the event of emergency condition, such as breakdown of the accessory, may be readily severed to permit the continued operation of the drive engine independently of the accessory.

Another object of the present invention is the provision of a cutting element and a control device therefor which brings the cutting element into engagement with a weakened portion of the coupling slowly, rather than abruptly, avoiding vibration or chattering between the cutting element and the coupling.

Still another object of the present invention is the provision of means to insure separation of the severed parts of the coupling after the cutting operation.

These and other features of the present invention will be apparent from the detailed description of the invention which follows and by reference to the accompanying drawings in which.

Figure 1:
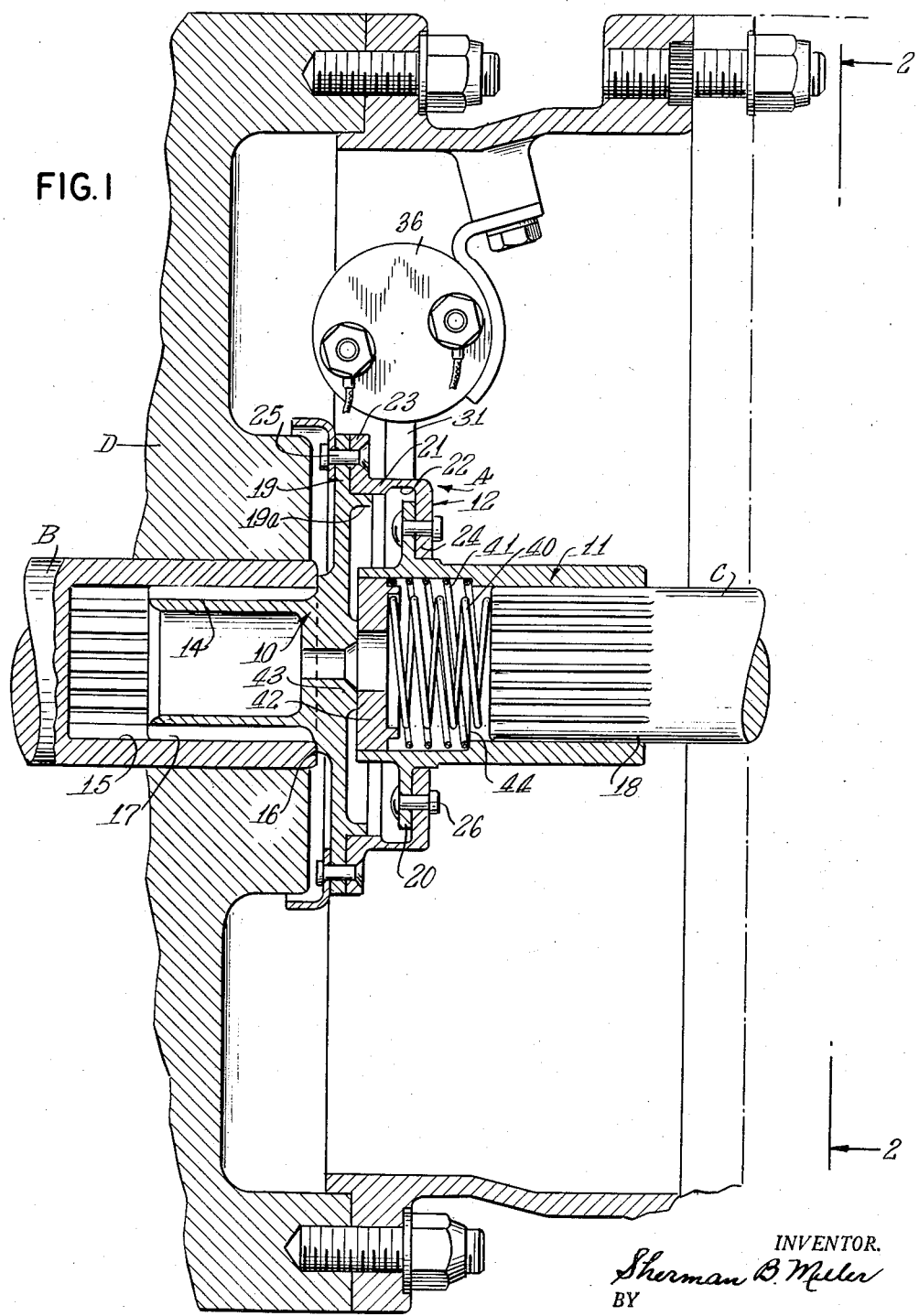
Figure 1 is a cross-sectional elevation view of apparatus embodying the present invention.

Referring to Figure 1 of the drawings, the coupling assembly, generally designated A, embodying the present invention transmits the drive between a shaft B driven from the main engine or power plant (not shown) and a shaft C which transmits the drive to an accessory (not shown). The shaft B is rotatably supported in the frame D. The coupling assembly A comprises generally an adapter element 10 which is coupled to the drive shaft B, an adapter 11 which is coupled to the driven shaft C, and an annular connector ring 12 which connects the adapters 10 and 11.

A hollow cylindrical hub 14 is formed integrally with the adapter 10 on one side thereof, and the hub 14 is received within a recess 15 in the extreme end of the drive shaft B. The outer periphery of the hub 14 is coupled to the shaft B by means of a splined connection 17 so that they rotate together. A shoulder 16 of the adapter element 10 abuts against the extreme end of the shaft B, and a disk-like portion 19 is formed integrally with the hub 14 just outboard of the end of the shaft. A circular hub 19a is formed on the outboard face of the disk-like portion.

The adapter element 11 is essentially a hollow cylindrical member open at both ends. An annular flange 20 is formed integrally with and around the adapter element 11. The driven shaft C is received within one end of the adapter element 11, and the adapter element and the shaft are coupled together by a splined connection 18 so that they rotate together.

The annular connector ring 12 which connects the adapter elements 10 and 11 comprises a hollow cylindrical ring 21 having a groove 22 defined therein, an outwardly turned flange 23 formed integrally with one end of the cylindrical ring, and an inturned flange 24 formed integrally with the other end of the cylindrical ring. A planar surface of the outwardly turned flange 23 forming one end of the connector ring 12 abuts against a planar face of the disk-like portion 19 of the adapter element 10, and the flange 23 and the disk-like portion 19 are attached together by rivets 25. The inner circumference of the flange 23 is in relatively tightfitting relationship with the outer circumference of the hub 19a, so that the circular hub 19a facilitates the proper alignment between the adapter element 10 and the connector ring 12.

The inturned flange 24 abuts against one face of the annular flange 20 of the adapter element 11, and these flanges are attached together by rivets 26. It may be noted that the engagement between the inner circumference of the outturned flange 23 and the shoulder 19a, and the engagement of the inner edge of the inturned flange 24 with the outer periphery of the adapter element 11, in combination with the face-to-face engagement between the outturned flange 23 and the disk-like portion 19 and the inturned flange 24 and the flange 20, provide a rigid coupling between the shafts B and C which insures concentricity between the axis of the coupling assembly A and the axes of the shafts B and C.

The groove 22 in the connector ring 12 weakens the center of the connector ring in the plane of a cutting element 30 (see Figure 2) to facilitate the severing thereof by the cutting element 30.

Figure 2:
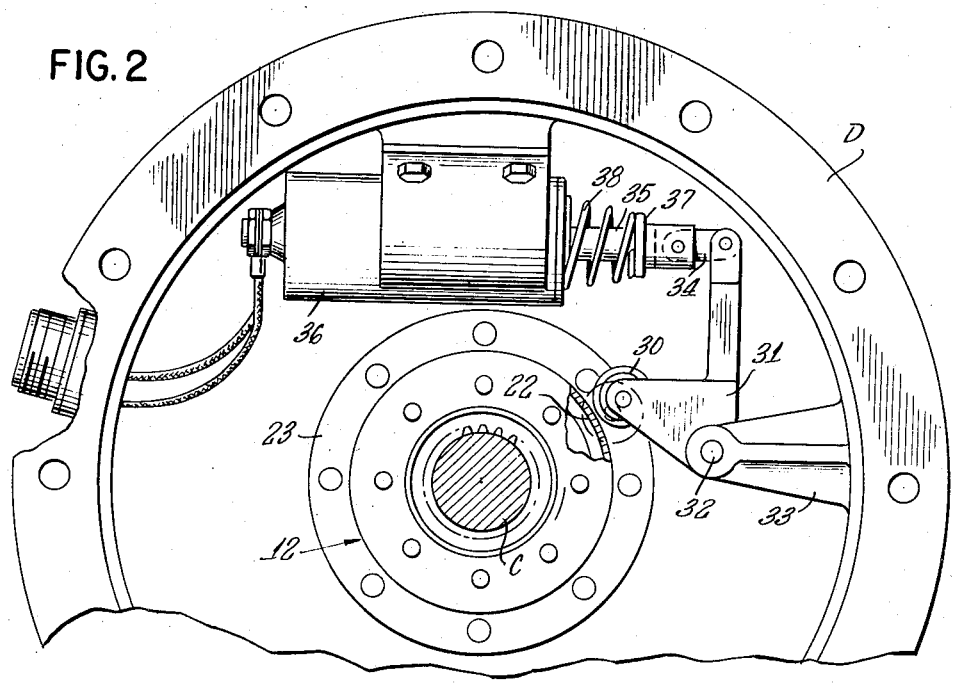
Figure 2 is a view taken along the line 2—2 of Figure 1 looking in the direction of the arrows.

Referring to Figure 2, the cutting element 30 is supported by a bellcrank lever 31 which is pivotally mounted to a shaft 32 supported by a rigid arm 33 formed inwardly of the frame D. The upper end of the bellcrank lever 31 is connected by a link 34 to the movable armature 35 of an electrical solenoid 36. The armature 35 carries a coiled compression spring 38 thereon which acts at one end against the housing of the solenoid and at the other end against a collar 37 affixed to the armature, so that the action of the spring urges the bellcrank lever 31 into a position in which the cutting element 30 is held out of engagement with the connector ring 12. Upon energization of the solenoid 36, however, the bellcrank lever is pivoted to bring the cutting element 30 into engagement with the outer periphery of the connector ring 12 in the plane of the weakened portion 22 thereof, so that after a number of revolutions the coupling will be severed, thereby disconnecting the shafts B and C.

The apparatus of the present invention includes means to insure positive separation of the parts of the coupling after severance thereof by the cutting element 30. Accordingly, as shown in Figure 1, the end of the adapter element 11 in proximity to the adapter element 10 contains a pair of concentric compression springs 40 and 41 which are held therein by a retaining disk 42. The spring retaining disk 42 is loosely accommodated within the hollow adapter element 11. The outer face of the disk 42 abuts againts the surface of an annular raised bearing 43 formed on the face of the adapter element 10 opposite the hub portion 14, thereby retaining the disk within the open end of the adapter element 11. The inner spring 40 acts between the disk 42 and the end of the shaft C to take up any axial play therebetween. The outer spring 41 acts between the disk 42 and a shoulder 44 formed within the adapter element 11. Upon severance of the connector ring 12, the spring 41 urges the adapter elements 10 and 11 apart, thus insuring separation between the severed edges of the parts of the connector ring 12. Since the retainer disk 42 is loosely accommodated within the adapter element 11, it will not transmit the drive from the rotating adapter element 10 to the adapter element 11 after severance, notwithstanding the fact that the rotating adapter element 10 still continues to hold the retainer disk 42 within the non-rotating adapter element 11.

Figure 3:
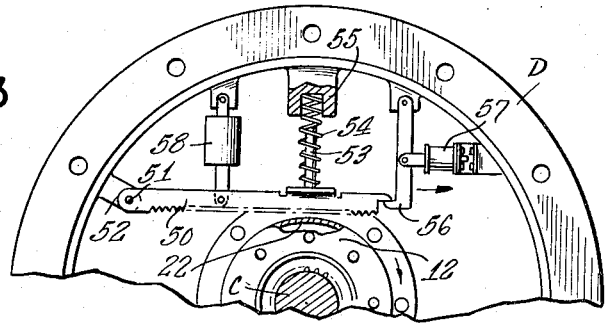
Figures 3 and 4 are views similar to Figure 2 illustrating different embodiments of the invention.

It is evident that the cutting element and the actuating mechanism therefor may take various forms. For example, in Figure 3, the cutting element 50 is a saw blade pivotally mounted at 51 to a boss 52 projecting inwardly from the frame D. The saw carries an upstanding rod 53. The axis of the rod 53 is preferably substantially perpendicular to the edge of the saw blade 50 at the point of tangency with the connector ring 12. The upstanding rod accommodates thereon a coiled compression spring 54. One end of the compression spring 54 is received within the spring retaining member 55 affixed to the housing D, whereas the opposite end acts against the saw, urging it into engagement with the connector ring 12. A pivotal latch 56, however, normally engages the end of the saw blade 50, holding it out of contact with the connector ring. The latch 56 is adapted to be released by the actuation of the solenoid 57. Upon release of the latch 56, the saw blade 50 is urged into cutting engagement with the connector ring 12. A dashpot 58 is connected to the saw blade, so that the saw blade will move slowly into engagement with the coupling, thereby avoiding abrupt engagement therewith.

Figure 4:
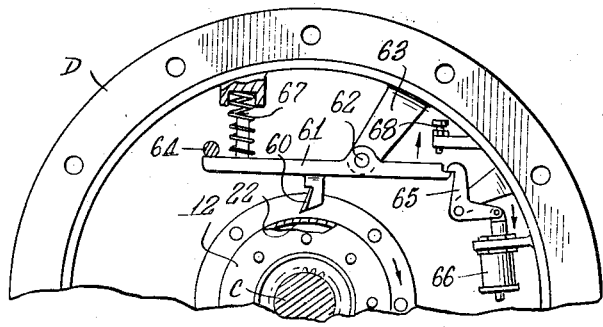

In the embodiment illustrated in Figure 4, the cutting element 60 is supported by a lever 61 pivotally mounted at 62 to a boss 63 depending from the frame D. The cutting element is adapted normally to be held in inoperative position against a stop 64 by the engagement of a pivotal latch 65 with an end of the lever. Upon energization of the solenoid 66, however, the latch 65 releases the lever 61, permitting the spring 67 to bring the cutting element into engagement with the coupling. Upon severance of the connector ring 12, the lever arm 61 moves into engagement with an adjustable stop 68 until the lever 61 and latch 65 are reset.

The invention has been shown by way of example only, and obviously many variations and modifications may be made therein without departing from the spirit of the invention. The invention, therefore, is not to be limited to any specified form or embodiment, except in so far as such limitations are set forth in the claims.

I claim:

1. A severable coupling for a drive transmission comprising an adapter member connected to the drive end of the transmission, an adapter member connected to the driven end of the transmission, said adapter members being coaxial and closely spaced to each other, one of said adapter members having a disk-like portion formed integrally therewith, the other of said adapter members having a hollow end adjacent said disk-like portion of the other adapter member, a compressed spring accommodated within said hollow end, a spring retaining disk loosely accommodated within the hollow end of the adapter member, said spring acting between the spring retaining disk and the adapter member within which it is accommodated, thereby urging the spring retaining disk into engagement with the disk-like portion of the other adapter member, the engagement therebetween retaining the spring retaining disk within the hollow end, and a severable coupling ring connecting the adapter members, the arrangement being such that upon severance of the coupling ring the compressed spring separates the severed parts of the coupling ring.

2. A severable coupling as set forth in claim 1 wherein the severable coupling ring comprises a ring portion, an outwardly extending flange at one end thereof attached to the disk-like portion of the one adapter member and an inwardly extending flange at the other end thereof attached to the other of said adapter members.

3. In combination with the severable coupling as set forth in claim 1, a cutting element normally out of engagement with the severable coupling ring, but movable into engagement therewith, and actuating means therefor.

4. A quickly severable drive transmission between a drive engine and a driven accessory comprising a drive shaft connected to the drive engine, a coaxial driven shaft connected to the driven accessory, the drive shaft and the driven shaft having ends which are spaced apart from each other, an adapter member splined to the end of the drive shaft, an adapter member splined to the end of the driven shaft, one of said adapter members having a disk-like portion formed integrally therewith adjacent the end of the shaft to which it is coupled, the other of said adapter members having a hollow portion which projects beyond the end of the shaft to which it is coupled, a shoulder formed internally of said hollow adapter member, a compressed spring accommodated within said hollow adapter member and engaging said shoulder, a spring retaining disk loosely accommodated within the end of the hollow adapter member holding the compressed spring therein, said spring retaining disk engaging the disk-like portion of the other adapter member, a severable coupling ring connecting the said adapter members, said severable coupling ring being weakened in a plane normal to the axis of said shafts, an outwardly extending flange formed integrally with the severable coupling ring on one side of the weakened portion of the coupling ring, said outwardly extending flange abutting and being affixed to the disk-like portion of the one adapter member, an inwardly extending flange formed integrally with the severable coupling ring on the other side of the weakened portion of the coupling ring, said inwardly extending flange abutting and being affixed to the flange surrounding the other adapter member, a movable cutting element in the plane of the weakened portion of the severable coupling ring, said cutting element being normally positioned out of contact with the severable coupling ring, and means for actuating the cutting element to sever the coupling ring, the compressed spring separating the severed parts of the coupling ring while the engagement between the spring retaining disk and the disk-like portion of the other adapter member slips without transmitting the drive from the adapter member coupled to the drive shaft to the adapter member coupled to the driven shaft.

5. A quickly severable drive transmission as set forth in claim 4 wherein the inner periphery of the inwardly extending flange engages the outer periphery of the respective adapter member.

6. A quickly severable drive transmission as set forth in claim 4 including aligning means between the disk-like portion of the adapter member and the outwardly extending flange of the severable coupling ring.

References Cited in the file of this patent
UNITED STATES PATENTS
2,727,371   Troeger et al. _____ Dec. 20, 1955